UNITED STATES PATENT OFFICE.

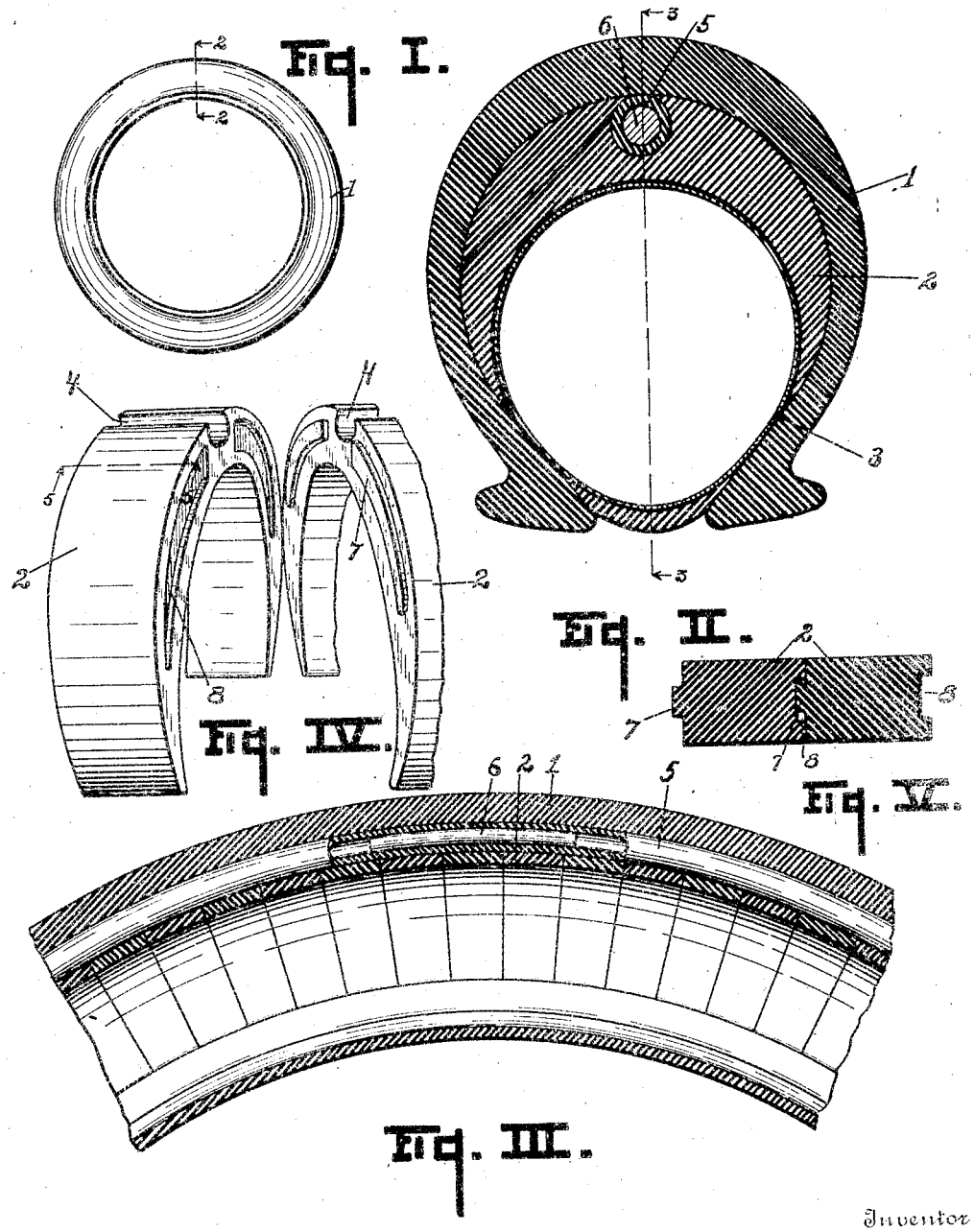

HERBERT B. GILLETTE, OF GRAND RAPIDS, MICHIGAN, ASSIGNOR TO THE PENINSULA TIRE AND RUBBER COMPANY, OF GRAND RAPIDS, MICHIGAN, A CORPORATION OF MICHIGAN.

PNEUMATIC TIRE.

1,100,726.  Specification of Letters Patent.  Patented June 23, 1914.

Application filed June 7, 1912. Serial No. 702,147.

*To all whom it may concern:*

Be it known that I, HERBERT B. GILLETTE, a citizen of the United States, residing at the city of Grand Rapids, county of Kent, and State of Michigan, have invented certain new and useful Improvements in Pneumatic Tires, of which the following is a specification.

This invention relates to improvements in pneumatic tires.

The main objects of this invention are,—

First, to provide an improved pneumatic tire which is durable in use and is not likely to be injured by punctures or blowouts.

Second, to provide an improved tire element adapted as a protector for pneumatic tires which does not materially affect the elasticity or resiliency of the tire, and which at the same time effectively protects the inner tube.

Third, to provide an improved tire element having these advantages which may be readily inserted in either new or a used pneumatic tire of the common type consisting of an outer casing, and an inner tube or pneumatic tube.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side elevation of a tire embodying the features of my invention. Fig. II is an enlarged detail cross section taken on a line corresponding to line 2—2 of Figs. I and III. Fig. III is a detail longitudinal section taken on a line corresponding to line 3—3 of Fig. II, the articulating ring 5 being shown partially in full lines, the inner tube being omitted. Fig. IV is a detail perspective view of a pair of the members 2. Fig. V is a cross section on a line corresponding to line 5—5 of Fig. IV.

In the drawing, similar reference characters refer to similar parts throughout the several views, and the sectional views are taken looking in the direction of the little arrows at the ends of the section lines.

Referring to the drawing, the outer casing 1 is shown in conventional form and is indicated as being formed of rubber. It is my intention to use any suitable outer casing. My improved protector element comprises a plurality of crescent shaped or segmental members 2 preferably formed of rubber or other suitable resilient material. These members 2, are in practice, about an inch or an inch and a quarter long and extend well up on the side of the casing to embrace the greater portion of the sides of the inner tube 3. The members 2 are provided with notches 4 at their bases which engage the articulating ring 5. This articulating ring 5 is preferably a piece of rubber tubing such as steam hose and the notches 4 are of such depth as to effectively engage the ring. The ends of tube are joined as by suitable coupling 6,—see Fig. III. The curvature of the notches is greater than a half circle so that when the members are engaged on the tubing they are not likely to be accidentally disengaged.

The members 2 are preferably tapered inwardly in cross section,—see Fig. V. The arms of the members are also preferably tapered toward their ends so that when the members are placed on the ring, they fit together. The members are placed within the casing under compression,—that is, there are a sufficient number of the members 2 on the ring so that their sides are held in contact by their own resiliency. The sides of the members 2 are preferably provided with co-engaging tongues and grooves 7 and 8 respectively. The tongues and grooves extend outwardly from the ring engaging notches 4 well toward the ends. The grooves are of such width as to permit a limited in and out movement of a member independent of the adjacent members. The articulating ring 5 being formed of tubing, permits a free expansion of the members 2 and the members effectively grip the ring so that they do not slide or shift their positions thereon. The articulating ring is also entirely flexible and resilient and does not add materially to the rigidity of the tire. The inner tube expands and forces the protector members 2 into contact with the outer casing making a continuous jointed support for the inner tube. In the event of the outer casing being penetrated with a nail or the like, the point of the nail engaging one of the members 2, the member will ordinarily yield before being penetrated. This ordinarily deflects the point between the member and the casing, or the member yields sufficiently before being penetrated to prevent the nail reaching the inner tube or the nail is embedded in the member. In the event of the nail penetrating the outer casing and engaging between a pair of the members 2, the nail is ordinarily deflected by the yielding of the members and the joint tongue 7 before it reaches the inner tube and is embedded in one or the other of the members. In the event of cuts or like openings in the outer casing, the members 2 effectively bridge the opening and prevent the inner tube blowing out therethrough. The tongues and grooves on the sides of the members 2 may be omitted and the structure will still be very efficient and satisfactory.

I have illustrated and described my improvements in detail in the form now preferred by me. I have not attempted to illustrate or describe various modifications which I contemplate, as such modifications will, from the disclosure made, be readily understood by those skilled in the art to which this invention relates. I desire, however, to be understood as claiming my improvements in the specific form illustrated as well as broadly within the scope of the appended claims. The generic claims of my invention, however, as to certain features appear in my companion application filed October 8, 1912, Serial No. 724,499.

Having thus described my invention, what I claim as new and desire to secure by Letters Patent is:

1. In a tire, the combination with an outer casing and a pneumatic tube, of a protector interposed between the casing and tube comprising a ring of tubular resilient material and crescent shaped members of resilient material having curved notches at their bases engaging said ring, the curvature of the notches being greater than a half circle, said members being inwardly tapered in cross section and provided with co-engaging tongues and grooves on their sides extending outwardly from each side of the ring engaging notches; the grooves being of such width as to permit limited collapsing or expanding movement of each member independently of its adjacent members, the members being arranged on said ring within said outer casing under compression, the pneumatic tube being arranged within said protector element.

2. In a tire, the combination with an outer casing and a pneumatic tube, of a protector interposed between the casing and tube comprising a ring of tubular resilient material and crescent shaped members of resilient material having curved notches at their bases engaging said ring, the curvature of the notches being greater than a half circle, said members being inwardly tapered in cross section, the members being arranged on said ring within said outer casing under compression, the pneumatic tube being arranged within said protector element.

3. In a tire, the combination with an outer casing and a pneumatic tube, of a protector interposed between the casing and tube comprising a ring of resilient material and crescent shaped members of resilient material having notches at their bases engaging said ring, the said members provided with co-engaging tongues and grooves on their sides, the grooves being of such width as to permit limited collapsing or expanding movement of each member independently of its adjacent members, the members being arranged on said ring within said outer casing under compression, the pneumatic tube being arranged within said protector element.

4. In a tire, the combination with an outer casing and a pneumatic tube, of a protector interposed between the casing and tube comprising an articulating ring and segmental members having notches at their bases engaging said ring, the said members provided with co-engaging tongues and grooves on their sides, the grooves being of such width as to permit limited collapsing or expanding movement of each member independently of its adjacent members.

5. An element for pneumatic tires comprising a ring of tubular resilient material and crescent shaped members of resilient material having curved notches at their bases engaging said ring, the curvature of the notches being greater than a half circle, said members being inwardly tapered in cross section and provided with co-engaging tongues and grooves on their sides extending outwardly from each side of the ring engaging notches, the grooves being of such width as to permit limited collapsing or expanding movement of each member independently of its adjacent members.

6. A tire element comprising a resilient articulating ring and segmental members having notches at their bases engaging said ring, the said members provided with co-engaging tongues and grooves on their sides, the grooves being of such width as to permit limited collapsing or expanding movement of each member independently of its adjacent members.

7. An element for pneumatic tires comprising an outer casing and an inner tube comprising a ring of tubular resilient material and crescent shaped members of resilient material adapted to embrace the inner tube and having curved notches on their convex faces engaging said ring, the curvature of the notches being greater than a half circle.

In witness whereof, I have hereunto set my hand and seal in the presence of two witnesses.

HERBERT B. GILLETTE. [L. S.]

Witnesses:
GRACE L. SENNA,
WILLIAM O. HUGHAW.